Mar. 27, 1923.

M. C. A. LATOUR 1,449,863

TWO-PHASE HIGH FREQUENCY ELECTRIC ALTERNATING CURRENT GENERATOR

Filed June 23, 1920

Witnesses
M. E. Watterson.
William Gillson

Inventor
Marius Latour
Per
W. T. Thompson
Attorney

Patented Mar. 27, 1923.

1,449,863

UNITED STATES PATENT OFFICE.

MARIUS C. A. LATOUR, OF LONDON, ENGLAND.

TWO-PHASE HIGH-FREQUENCY ELECTRIC ALTERNATING-CURRENT GENERATOR.

Application filed June 23, 1920. Serial No. 391,100.

*To all whom it may concern:*

Be it known that I, MARIUS C. A. LATOUR, citizen of the Republic of France, residing in London, England, have invented certain new and useful Improvements in Two-Phase High-Frequency Electric Alternating-Current Generators, of which the following is a specification.

This invention relates to high frequency homopolar alternators generating two phase currents and having stator slots of a size relatively important. The frequency of the current produced by this alternator is that usually used with wireless telephony and telegraphy.

It is well known that polyphase alternators possess the advantage of having a power per unit volume and an output higher than single phase alternators. It is moreover known that a wireless aerial can be fed by means of two phase current as shown for example by patent specification No. 1,145,239 in the names of Girardeau and Bethenod. In the machine which forms the object of the present invention it is aimed to produce high frequency two phase currents which can be used as shown in the above patent specification, in wireless telegraphy.

The invention is described in the accompanying drawings in which:—

The whole of the machine including the exciting winding is not shown as it forms no part of the invention.

The present invention can be applied as has been already stated above to a homopolar alternator of any type whatever and consists only of the modification effected in the teeth and the winding of this alternator in order to cause the generation of two phase high frequency currents.

Figure 2:
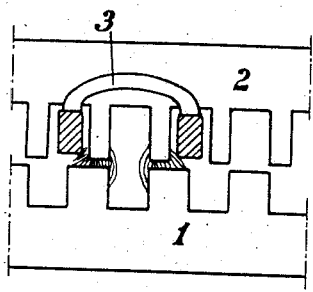
Figures 2 and 3 show the same parts in two different positions in order to set forth the variation in the flux in one coil when the rotor is displaced.
Figure 3:
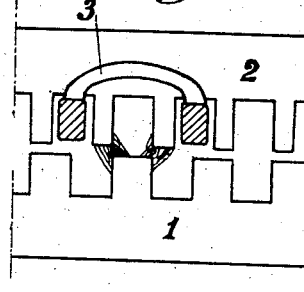

It is sufficient to state that the exciting flux, the path of which is shown in Figs. 2 and 3, does not change direction, and that, during the rotation of the rotor, it only undergoes periodic variations in intensity. Figure 2 shows the moments when the flux is a maximum and Figure 3 the moment when it is a minimum.

Figure 1:
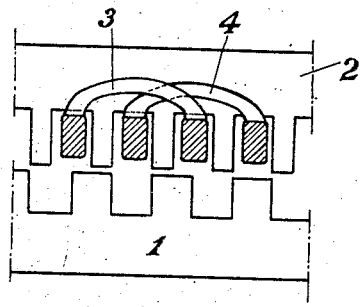
Figure 1 shows the stator teeth (above) and the rotor teeth (below) and the arrangement in the stator slots of two coils each belonging to the winding of one of the two phases.

Referring to Fig. 1, the exciting rotor 1 carries polar projections the width of which in the air gap is for example, equal to that of the empty spaces which represent the magnetic poles of opposite sign. The stator 2 carries slots the width of which for example is equal to that of the polar projections or empty spaces of the rotor and has teeth of half that width.

In the stator slots two distinct windings are alternately arranged in the manner shown in Figure 1 in which 3 represents a coil belonging to the first winding and 4 a coil belonging to the other winding. The two coils are crossed as in the case of two phase windings.

It will be shown that under these conditions the ratio of the number of teeth of the stator to the number of teeth of the rotor is 4 to 3.

This ratio is specially adopted in this case in order to produce two phase high frequency current and cannot be compared with a ratio having the same figures which may have been already applied to a machine generating single phase high frequency current and wound necessarily in another manner without crossed coils.

It will be easily seen by referring to Figures 1, 2 and 3 that, with this particular construction in the positions shown in Figures 1 and 2 the flux is a maximum in the coil 3. When the tooth 10 of the rotor is displaced to the right a distance equal to its width, the flux will be a minimum in this coil and the electromotive force in 3 will have undergone half a cycle. On the other hand, in the coil 4, the flux is a minimum when the rotor is displaced a distance equal to half the width of a tooth relatively to the position shown in Figure 1 and maximum when it is displaced a distance equal to one and a half times the width of a tooth.

It will thus be seen that the fluxes in the two windings are out of phase by an angle equal to $\frac{\pi}{2}$. It is the same for the current in each winding.

It will also be seen that the frequency produced is determined by the number of teeth of the rotor and that a displacement of the latter by a distance equal to twice the width of a tooth corresponds to the production of one period of alternating current.

Although in the drawings, the slots shown are of the "open" type the invention is not restricted to this type of slots and could equally be applied to machines having closed or half closed slots.

It must be noted that in a similar two phase machine generating current of frequency $f$, the reaction flux produced by the stator output is not fixed relatively to the exciting rotor as in the ordinary two phase machine but on the contrary rotates at a speed equal to $\frac{2}{3} f$ relatively to the exciting rotor.

In order to avoid excessive losses in this rotor it is necessary therefore, either to make it in a laminated form or to add to it a damping system formed for example by a squirrel cage in order to choke down the reaction flux.

I declare that what I claim is:—

A homo-polar high frequency alternator wound for two phase current comprising a rotor having a large number of magnetic poles, a stator having slots arranged opposite the poles of said rotor, the number of stator slots being to the number of rotor slots in the ratio of 4 to 3, and a winding carried by said stator slots each coil of said winding encircling two teeth and adjacent coils mutually crossing one another.

In witness whereof, I have hereunto signed my name this 9th day of June, 1920, in the presence of two subscribing witnesses.

MARIUS C. A. LATOUR.

Witnesses:
 JAMES ELLIS,
 JOSEPH L. SHULIN.